(12) United States Patent
Terminella et al.

(10) Patent No.: US 7,516,594 B1
(45) Date of Patent: Apr. 14, 2009

(54) APPARATUS AND METHOD FOR VACUUM SEALING A FOOD ITEM PACKAGE

(76) Inventors: Emanuele Terminella, 3180 E. Township, Fayetteville, AR (US) 72703; Frank Terminella, 490 Willoughby Rd., Fayetteville, AR (US) 72701; Joseph Terminella, 430 Willoughby Rd., Fayetteville, AR (US) 72701

( * ) Notice: Subject to any disclaimer, the term of this patent is extended or adjusted under 35 U.S.C. 154(b) by 636 days.

(21) Appl. No.: 11/255,786

(22) Filed: Oct. 21, 2005

Related U.S. Application Data

(63) Continuation of application No. 10/765,364, filed on Jan. 27, 2004, now abandoned, which is a continuation-in-part of application No. 09/932,315, filed on Aug. 17, 2001, now Pat. No. 6,691,491.

(60) Provisional application No. 60/226,627, filed on Aug. 18, 2000.

(51) Int. Cl.
*B65B 31/02* (2006.01)

(52) U.S. Cl. ............................... 53/86; 53/512

(58) Field of Classification Search .................. 53/432, 53/84, 86, 512, 289
See application file for complete search history.

(56) References Cited

U.S. PATENT DOCUMENTS

| | | | |
|---|---|---|---|
| 2,689,073 A * | 9/1954 | Twigg | 53/570 |
| 3,471,990 A | 10/1969 | Bonuchi et al. | 53/22 |
| 3,830,266 A * | 8/1974 | Hudson | 141/10 |
| 4,081,942 A | 4/1978 | Johnson | 53/22 |
| 4,164,111 A | 8/1979 | Di Bernardo | 53/434 |
| 4,215,524 A | 8/1980 | Saylor | 53/554 |
| 4,308,710 A | 1/1982 | Sandberg | 53/433 |
| 4,532,753 A | 8/1985 | Kovacs | 53/451 |
| 4,541,224 A * | 9/1985 | Mugnai | 53/434 |
| 4,633,654 A * | 1/1987 | Sato et al. | 53/511 |
| 4,768,327 A | 9/1988 | Mosher | 53/451 |
| 4,964,259 A | 10/1990 | Ylvisaker et al. | 53/433 |
| 4,965,986 A | 10/1990 | Klinkel | 53/551 |
| 4,999,974 A | 3/1991 | Kovacs et al. | 53/434 |
| 5,056,292 A * | 10/1991 | Natterer | 53/86 |
| 5,097,648 A * | 3/1992 | Berner et al. | 53/88 |
| 5,255,497 A | 10/1993 | Zoromski et al. | 53/551 |
| 5,279,098 A | 1/1994 | Fukuda | 53/451 |
| 5,400,565 A | 3/1995 | Terminella et al. | 53/133.4 |
| 5,505,037 A | 4/1996 | Terminella et al. | 53/133.4 |
| 5,669,715 A | 9/1997 | Dobreski et al. | 383/5 |
| 5,711,136 A | 1/1998 | Carcano | 53/434 |
| 5,713,669 A | 2/1998 | Thomas et al. | 383/204 |
| 5,775,812 A | 7/1998 | St. Phillips et al. | 383/5 |
| 5,833,791 A | 11/1998 | Bryniarski et al. | 156/244.25 |
| 5,924,173 A | 7/1999 | Dobreski et al. | 24/400 |
| 5,979,512 A * | 11/1999 | McGregor et al. | 141/83 |
| 6,059,456 A | 5/2000 | May | 383/63 |
| 6,691,491 B2 | 2/2004 | Terminella et al. | 53/133.4 |

* cited by examiner

*Primary Examiner*—Paul R Durand
(74) *Attorney, Agent, or Firm*—Keisling Pieper & Scott PLC; David B. Pieper; Meredith K. Lowry

(57) ABSTRACT

An apparatus and method for vacuum sealing a food item package. Compressed air forces air out of a food item package such that there is substantially no air within the package after it is sealed.

3 Claims, 4 Drawing Sheets

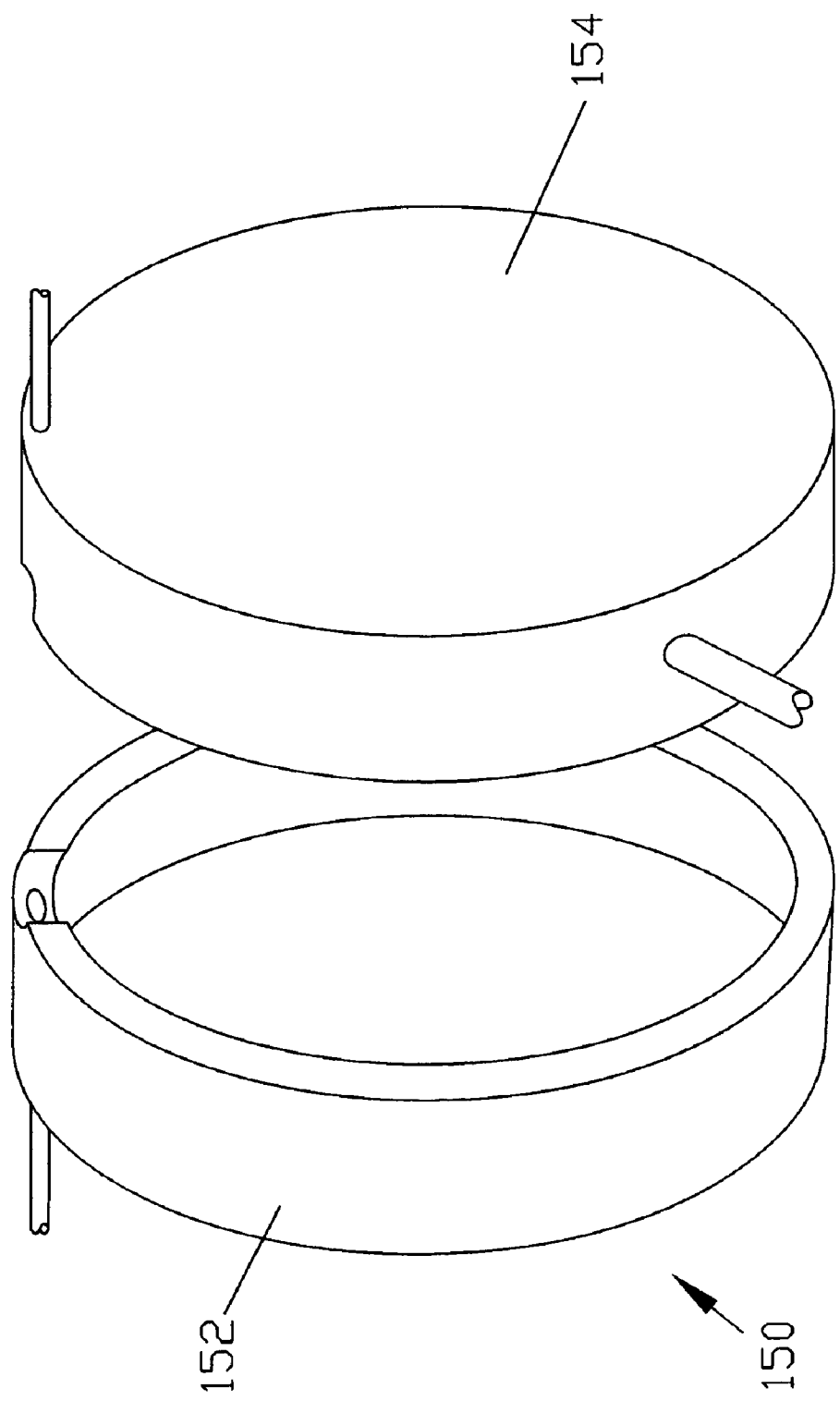

APPARATUS AND METHOD FOR VACUUM SEALING A FOOD ITEM PACKAGE

REFERENCE TO PENDING APPLICATIONS

This patent application claims priority to and is a continuation of U.S. patent application Ser. No. 10/765,364, filed Jan. 27, 2004 now abandoned; which is a continuation-in part of U.S. patent application Ser. No. 09/932,315, filed on Aug. 17, 2001 now U.S. Pat. No. 6,691,491, which claims priority to U.S. Provisional Application No. 60/226,627, filed on Aug. 18, 2000.

REFERENCE TO MICROFICHE APPENDIX

This application is not referenced in any microfiche appendix.

BACKGROUND OF THE INVENTION

1. Field of the Invention

The present invention relates to an improved vertical form, fill and seal packaging machine. More specifically, the present invention relates to a vertical food packaging machine that forms a vacuum seal of the packaged food products.

2. Prior Art

It is often desirable to seal packaged food products under a vacuum. This is typically accomplished by sucking the air out of a package prior to it being sealed. Those skilled in the art will appreciate that this is generally time consuming and therefore slows packaging process significantly.

An alternative method of forcing air out of a food item package is to press foam about the package and then seal it. By pressing foam blocks on opposite sides of a package, air is forced out of the package and it may be sealed. However, this is undesirable because foam may retain water and become infested with bacteria. It is well known in the art that it is highly undesirable to use any materials during packaging capable of retaining bacteria. Brushes have also been used in place of foam but are also capable of retaining water.

It is therefore desirable to provide a method for rapid, sterile vacuum sealing of packaged food items.

The present invention relates to apparati and methods for making air tight bags or packages for use with a multiple purpose convertible vertical form, fill and seal machine and method for making a variety of styles or types of bags including overlap or fin seals, pillow, potato chip, non-reclosable or reclosable, product-filled bags and especially zipper lock reclosable bags.

Package or bag making machines generally referred to as vertical form, fill and seal machines and methods for manufacturing individual pillow type packages with non-reclosable, midline overlap longitudinal seams or seals are described, for example, U.S. Pat. No. 4,532,753 to Kovacs, granted Aug. 6, 1985 (U.S. Cl. 53/451); U.S. Pat. No. 4,768,327 to Mosher, granted Sep. 6, 1988 (U.S. Cl. 53/451); U.S. Pat. No. 4,965,986 to Klinkel, granted Oct. 30, 1990 (U.S. Cl. 53/551); U.S. Pat. No. 4,999,974 to Kovacs, et al., granted Mar. 19, 1991 (U.S. Cl. 53/434); and U.S. Pat. No. 5,279,098 to Fukuda, granted Jan. 18, 1994 (U.S. Cl. 53/451). Typically, a heat sealable web material is supplied from a roll and is guided to a former located at the upper end of the machine. The former folds the flat web material into a vertically oriented tube surrounding a tubular filling mandrel or pipe. The edges of the folded web material overlap one another, and, as the folded tube moves downwardly over the mandrel, the overlapped marginal edge portions are heat sealed to one another by a cyclicly operated longitudinal sealing mechanism. The web is thus formed into a web tube which is advanced through the machine in package length increments. As packages are formed by the machine, product is also filled into them by a feeder device located on top of the machine. The feeder device is driven in synchronism with the remainder of the machine and cyclicly discharges measured quantities or charges of product into the upper end of the filling mandrel. A transverse or end sealing mechanism below the filling mandrel forms package end seals in the web tube by cyclicly flattening the tube and heat sealing the two layers of the flattened tube to one another through the use of two relatively moving jaws which reciprocate toward and away from the web tube from the front and back of the machine. During one closing movement of the jaws, the sealing mechanism simultaneously forms the top end seal of the leading package and the bottom end seal of the following package, and it also cuts the web material between the two seals to separate the leading package from the web tube. Between successive operations of the jaws, the web tube is advanced in package length increments by vertically reciprocating the sealing jaws or by using intermittently operated feed belts.

In the above-mentioned patents, the midline longitudinal overlap or fin seam or seal is formed as the web material lays relatively flat against the product filling pipe or mandrel. Packaging machines which form longitudinal fin seams or seals while the edges of the web material extend outwardly from the product filling mandrel are described, for example, in U.S. Pat. Nos. 5,255,497 to Zoromski, et al., granted Oct. 26, 1993 (U.S. Cl. 53/551) and 4,691,499 to Umeda, et al., granted Sep. 8, 1987 (U.S. Cl. 53/451).

Vertical form, fill and seal machines and methods for making reclosable bags from a bag forming film and a separate plastic zipper element with edge fin seals which extend outwardly from the product fill pipe are described, for example, in U.S. Pat. Nos. 5,400,565 and 5,505,037 to Terminella, et al., granted Mar. 28, 1995 and Apr. 9, 1996, respectively (U.S. Cl. 53/133.4). The plastic zipper element is fed between the film edges and the film and zipper are joined by vertically oriented heated sealing bars. The thus formed and sealed tube is filled with product through the fill tube and horizontal cross-seals and cross-cutters complete the individual bags. In these machines, the vertical and horizontal seals are formed by sealing members or jaws which reciprocate toward and away from the plastic film from the right and left sides of the device.

Attempts have been made to provide a vertical form, fill and seal machine which produces more than one type of package.

Various zippered and zipper lock packages are seen in the following patents: U.S. Pat. No. 6,059,456, "Reclosable Profile Arrangement Using Slidable Closure Strip", U.S. Pat. No. 5,924,173, "End Posts For Plastic Zipper", U.S. Pat. No. 5,896,627, "High-strength Slide R For a Reclosable Bag", U.S. Pat. No. 5,833,791, "Conforming End Stops For a Plastic Zipper", U.S. Pat. No. 5,775,812, "Tamper-Evident Reclosable Plastic Bag With Breakaway Slide R", U.S. Pat. No. 5,713,669, "Plastic Bag With Zipper Slide R Captured in Pocket", and U.S. Pat. No. 5,669,715, "Tamper-Evident Reclosable Plastic Bag With Slide R", the teachings of which are expressly incorporated by reference herein.

SUMMARY OF THE INVENTION

In accordance with an exemplary embodiment of the present invention, a convertible, highly adaptable, versatile vertical form, fill and seal machine and method is provided which not only makes edge fin seal non-reclosable or reclosable bags, but also is easily converted to produce other styles and types of durable, substantially air tight, product-filled and vacuum sealed bags at high speed and provides for the production of different size bags and accommodates different types and amounts of product in the bags.

In accordance with another exemplary embodiment of the present invention, a vertical form, fill and seal machine and method is provided which makes edge fin seal non-reclosable or reclosable product-filled and vacuum sealed bags. In accordance with yet another exemplary embodiment of the present invention, a vertical form, fill and seal machine and method is provided which makes midline overlap or fin seal pillow style non-reclosable or reclosable product-filled bags.

The present invention utilizes compressed air to vacuum seal a package containing food items. The device utilizes a clam-shell design to surround packaged food items and compress the packaging using compressed air. The device is easily retrofitted to packaging machinery such as that described in the above mentioned patents. Many packaging machines are pneumatically driven and so the present invention is easily incorporated into existing machines.

A vacuum supply is provided to hold open a small hole in the packaging so that air is allowed to escape. This is an important feature of the invention. Without a means of holding the package open, air within the package would not be allowed to escape. Once air has been removed from the package, the package may be heat sealed and separated from the web by any of a variety of methods known in the art. The use of compressed air allows a package to be vacuum sealed rapidly and slows the packaging process only slightly.

It is therefore an object of the present invention to provide a method for rapidly heat sealing a food item package in a sterile manner.

BRIEF DESCRIPTION OF THE DRAWINGS

FIG. 4 shows an alternative embodiment of the present invention.

DETAILED DESCRIPTION OF THE PREFERRED EMBODIMENTS

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention is preferably incorporated into the bottom of a vertical form, fill and seal packaging machine. It is located directly below the sealing mechanism. The clam shell design has two sides that come together to surround the lower most portion of a web having food items placed within it. Vacuum suction is applied to the web in order to maintain a hole between the portion of the web being formed into a food item package and the remaining part of the web such that they are in fluid communication. This ensures that the air within the portion of the web to be packaged has a route for leaving the packaging. The two halves of the invention come together, surrounding the portion of the web to be packaged and form an air tight seal. Compressed air is then applied to the chamber formed by the two halves of the invention. This forces air out of the food item package and into the remainder of the web. The packaged portion of the web is then heat sealed. The two halves of the invention then are drawn apart and the package is allowed to fall. This process is then repeated with the next portion of the web to be formed into a package.

Figure 1:
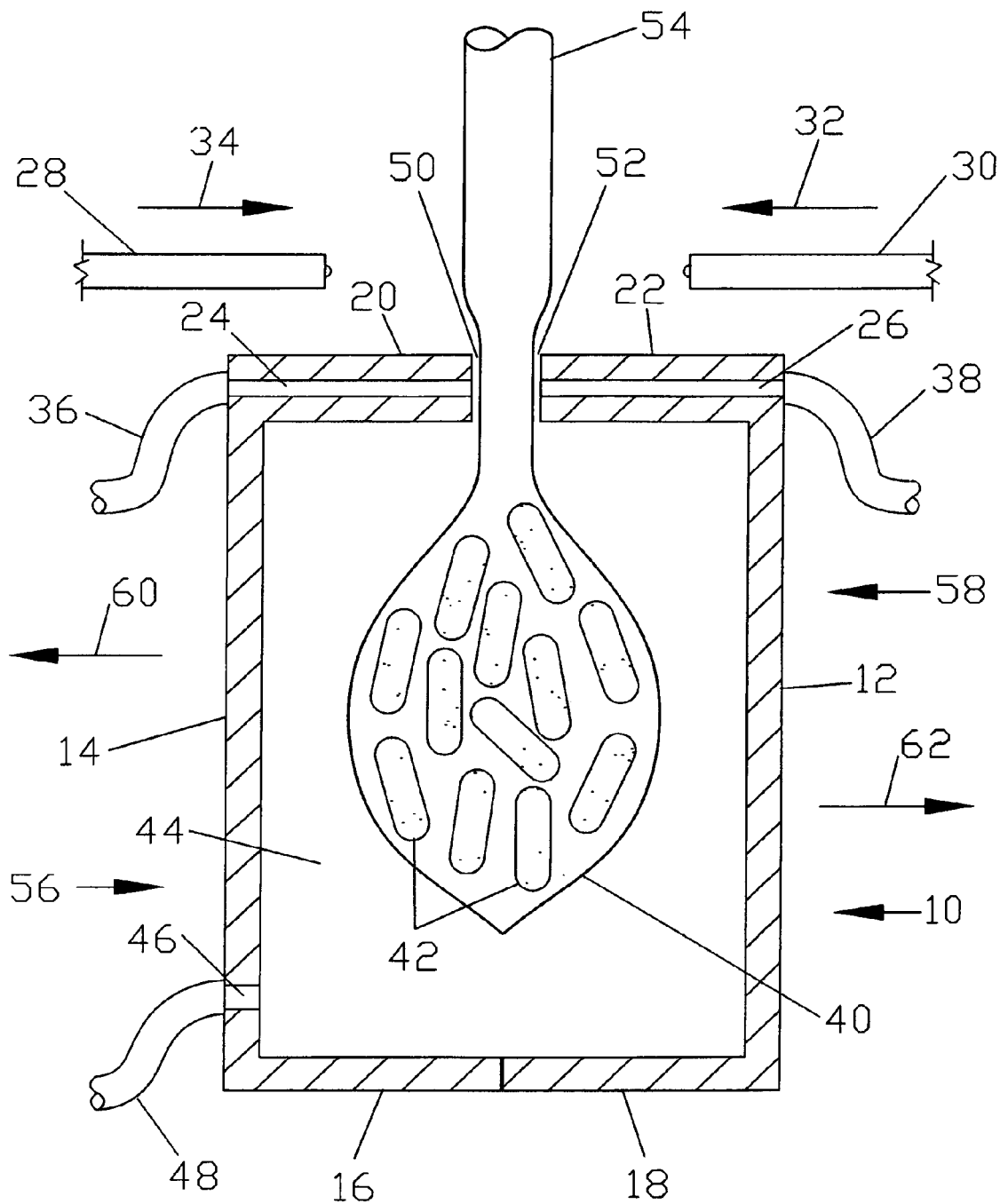
FIG. 1 shows a cross-section view of the present invention.

FIG. 1 shows the present invention 10. Web 54 includes packaging portion 40 that is filled with food items 42. Clam shells 56 and 58 are held together such that they form air tight chamber 44. Clam shell 56 is comprised of top wall 20, bottom wall 16 and rear wall 14. The side walls are not shown in FIG. 1. Similarly, clam shell 58 comprises top wall 22, bottom wall 18, and rear wall 12. Clam shells 56 and 58 are preferably comprised of stainless steel but may be comprised of other materials known in the art. As can be seen, top walls 20 and 22 include lips 50 and 52 respectively. These lips form a small opening through which air may pass from package portion 40 to the remainder of the web 54. Once clam shells 56 and 58 are engaged with each other to form chamber 44, a vacuum is applied to lips 50 and 52 by means of tubes 36 and 38 and through passages 24 and 26. This holds the web open and prevents compressed air in chamber 44 from leaking between lips 50 and 52 and closing off the opening between package portion 40 and the web 54.

Compressed air is then applied to chamber 44 by tube 48 through hole 46. The compressed air in chamber 44 forces air out of package portion 40 and into web 54. Heat sealing mechanisms 28 and 30 are then moved in the direction of arrow 34 and arrow 32 respectively. Devices 28 and 30 then melt the web and detach package portion 40 from web 54. Clam shell 56 is then moved in the direction of arrow 60 while clam shell 58 is simultaneously moved in the direction of arrow 62. This allows the package to drop below the device. Typically it will drop onto a conveyor belt.

Figure 2:
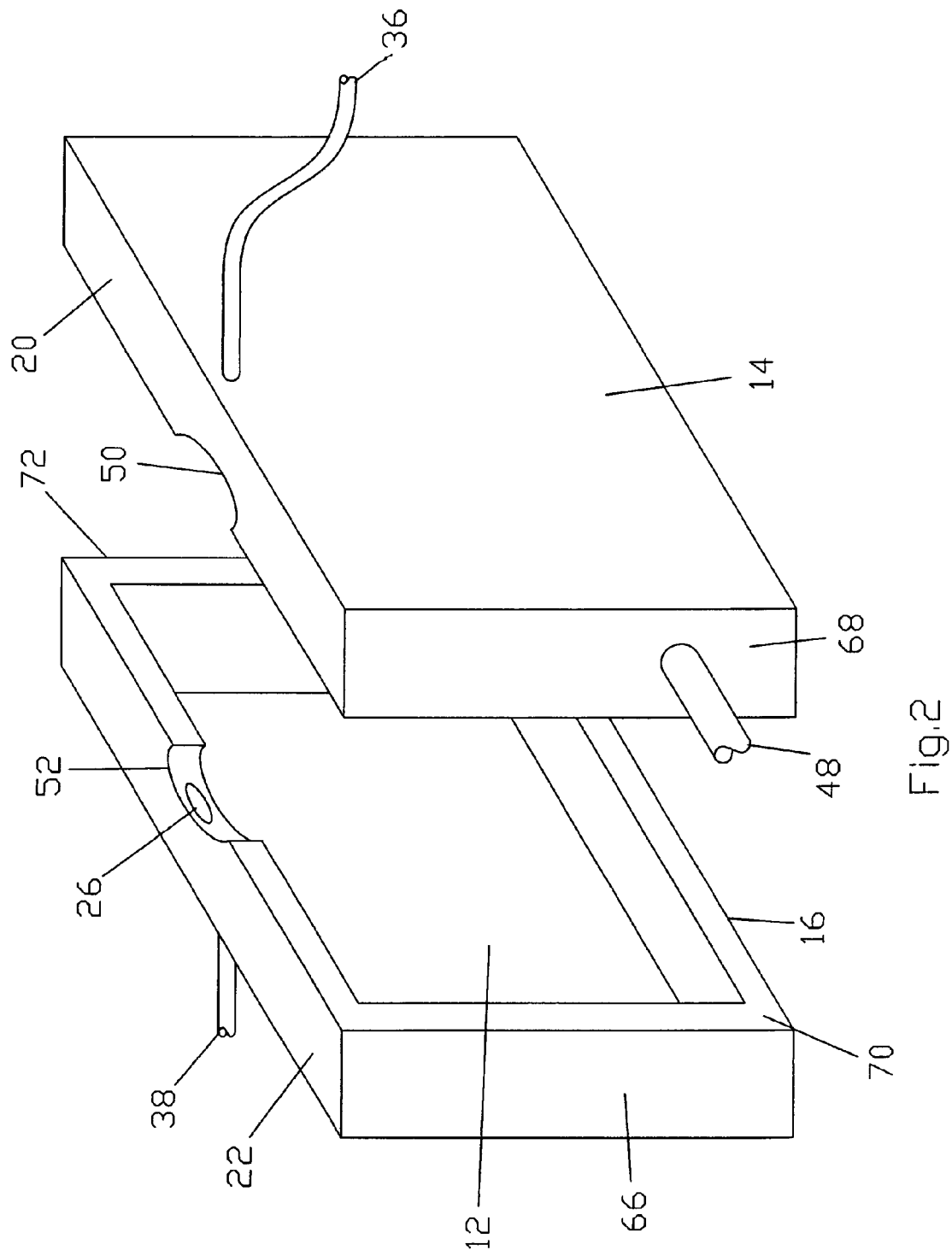
FIG. 2 shows a perspective view of the present invention.

FIG. 2 shows a perspective view of the present invention. Here, side walls 66, 72 and 68 can be seen. When the two sides of the device engage one another, surface 70 creates an air tight seal. Surface 70 preferably has a rubber or similar coating in order to ensure that the seal is air tight. In this view, tube 48 is attached to side wall 68 instead of rear wall 14. Tube 48 that supplies compressed air to the invention may be located on any of the walls. In FIG. 2, it can be seen that lips 50 and 52 are curved. Lips 50 and 52 are preferably slightly curved without any sharp angles. If lips 50 and 52 are angular, the web will be held less firmly against them. Although an angular shape for the lips may still work, the curved design is preferred.

Figure 3:
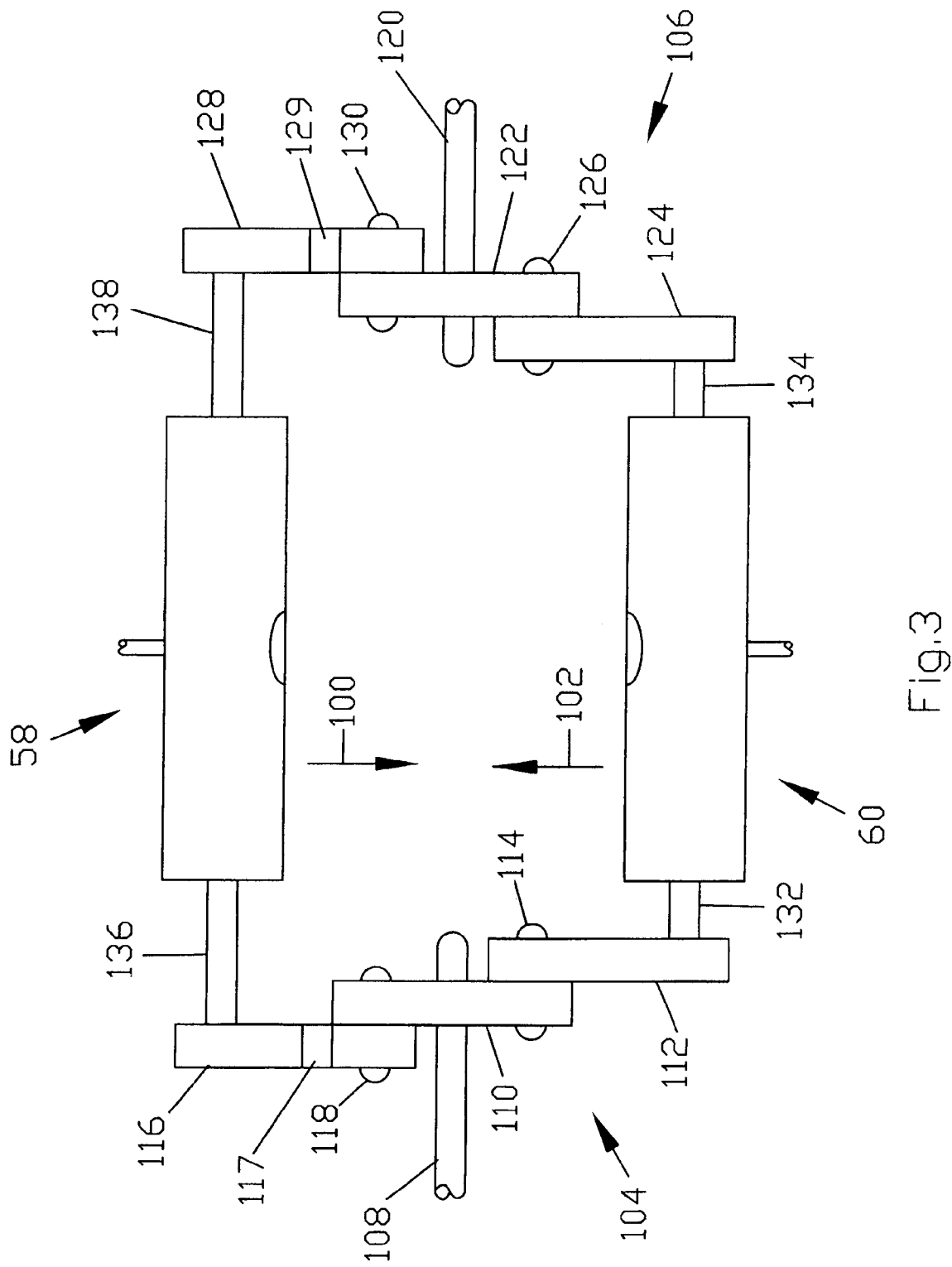
FIG. 3 shows a top view of the present invention.

FIG. 3 shows one method of opening and closing the invention. Clam shell 58 is rotatably attached to closing mechanism 104 by rod 136. Similarly, clam shell 58 is also rotatably connected to closing mechanism 106 by rod 138. Clam shell 60 is also rotatably attached to both closing mechanism 104 and mechanism 106 by rods 132 and 134 respectively.

Closing mechanism 104 is held in place by axle 108. Axle 108 is rigidly connected to swinging arm 110. Swing arm 110 is rotatably attached to locking arm 112 by pivot pin 114. Similarly, swing arm 110 is rotatably attached to locking arm 116 by pivot pin 118. To close the invention and press clam shells 58 and 60 together, axle 108 is rotated 180°. Groove 117 in locking arm 116 is slightly larger than axle 108 and allows locking arm to swing underneath axle 108 as swing arm 110 rotates 180°. Locking arm 112 has a similar groove on its bottom. As axle 108 and swing arm 110 rotate 180°, their pivotal engagement to lock arms 116 and 112 cause clam shell 58 to move in the direction of arrow 100 and clam shell 60 to move in the direction of arrow 102.

Locking mechanism 106 operates in an identical but symmetric fashion. Axle 120 is rigidly engaged to swing arm 122. Swing arm 122 is pivotally attached to lock arm 124 by pivot pin 126. Swing arm 122 is also pivotally attached to locking arm 128 by pivot pin 130. Locking arm 128 has a groove 129 slightly larger than axle 120. Axle 120 rotates 180° simultaneously with axle 108. When both axles have fully rotated 180°, clam shells 58 and 60 become engaged to one another to form an air tight chamber. Those skilled in the art will appreciate that locking mechanisms 104 and 106 are easily incorporated into existing packaging machines. It is preferred to have two mechanisms, one on each side of the clam shells, because this ensures an air tight seal between clam shells 58 and 60. It is possible to utilize only one locking mechanism. However, those skilled in the art will appreciate that this will result is a less secure seal between the two clam shells. Those skilled in the art will appreciate that the locking mechanism shown in FIG. 3 is only one of many possible methods for locking the two clam shells together to form an air tight chamber. Pistons, pneumatically driven or otherwise, may be used to push the two clam shell pieces together. Other methods are also known in the art.

In the figures, the walls that make up clam shells 58 and 60 are all at right angles to one another. However, those skilled in the art will appreciate that a variety of shapes are suitable for clam shells 58 and 60. Typically, it is simpler and easier to manufacture the device such as this using flat parallepiped walls. However, the clam shells may be more hemispherical in shape if desired.

FIG. 4 shows an alternative embodiment of the present invention 150. Alternative embodiment 150 is comprised of rounded clam shells 152 and 154.

Whereas, the present invention has been described in relation to the drawings attached hereto, it should be understood that other and further modifications, apart from those shown or suggested herein, may be made within the spirit and scope of this invention.

What is claimed is:

1. A device for vacuum sealing a food item package formed from a web of material, the device comprising:
   a first clam shell having a lip and a passage for supplying a vacuum to the lip;
   a second clam shell having a lip and a passage for supplying a vacuum to the lip;
   a vacuum supply applied to each of the lips of the clam shells to engage the web to form an air tight chamber;
   wherein the web and the first and second clam shells may be engaged so as to form an air tight chamber around the entire food item package; and
   an air supply for supplying compressed air into the air tight chamber such that the web does not disengage from the first and second clam shells.

2. The device of claim 1 wherein the lips are curved.

3. The device of claim 1 further comprising at least one locking mechanism comprising:
   a rotating axle;
   a swing arm rigidly attached to the rotating axle;
   a locking arm pivotally attached to the first clam shell and the swing arm;
   a second locking arm rotatably attached to the second clam shell in the swing arm; and
   such that when the rotating axis is rotated 180° the first clam shell and the second clam shell are engaged to form an air tight chamber.

* * * * *